United States Patent [19]
Henshaw

[11] Patent Number: 5,726,442
[45] Date of Patent: Mar. 10, 1998

[54] OPTO-ELECTRONIC SCALE READING APPARATUS HAVING LIGHT-TRANSMISSIVE PHASE-ENCODING ARRAY OF ELONGATE SPECTRAL ENCODING ELEMENTS

[75] Inventor: James R. Henshaw, Stroud, United Kingdom

[73] Assignee: Renishaw plc, Wotton-under-Edge, England

[21] Appl. No.: 577,539

[22] Filed: Dec. 22, 1995

[30] Foreign Application Priority Data

Dec. 22, 1994 [GB] United Kingdom ............... 9425907

[51] Int. Cl.$^6$ ................................................. G01J 3/50
[52] U.S. Cl. ........................ 250/226; 250/237 G; 356/373
[58] Field of Search ........................ 250/226, 231.16, 250/237 R, 237 G; 356/373–375, 356, 358

[56] References Cited

U.S. PATENT DOCUMENTS

| | | | |
|---|---|---|---|
| 4,814,601 | 3/1989 | Jones | 250/226 |
| 5,064,290 | 11/1991 | McMurtry et al. | 250/231.16 |
| 5,214,280 | 5/1993 | Rieder et al. | 250/231.16 |
| 5,302,820 | 4/1994 | Henshaw et al. | 250/231.16 |
| 5,302,821 | 4/1994 | Igaki et al. | 250/231.16 |

FOREIGN PATENT DOCUMENTS

| | | |
|---|---|---|
| 207 121 | 1/1987 | European Pat. Off. |
| 272 297 | 6/1988 | European Pat. Off. |
| 0 484 104 A1 | 5/1992 | European Pat. Off. |
| 3209043 A1 | 3/1982 | Germany |
| 1 311 275 | 6/1973 | United Kingdom |
| 1 504 691 | 3/1978 | United Kingdom |
| WO 89/05440 | 6/1989 | WIPO |
| WO 90/13006 | 11/1990 | WIPO |

*Primary Examiner*—Que Le
*Attorney, Agent, or Firm*—Oliff & Berridge PLC

[57] ABSTRACT

An opto-electronic scale reading apparatus includes a reflective scale (410) relative to which a readhead is movable. The readhead includes a light source in the form of the emission end of an optical fiber (300), which directs light via collimating lens (420), beam splitter (310), and deflecting optics (312,314) onto the scale. The light reflected from the scale passes through an index grating (416) to generate a series of spatial fringes in the plane of an analyzer (418). The analyzer comprises a series of elongate light transmitting color filters, extending substantially parallel to the fringes and arranged in a repeating pattern (e.g. red, blue, green, red, blue . . . ); like-colored elements are separated by a distance corresponding to an integer multiple of the fringe pitch. The array (418) encodes the fringes into a plurality of phase-shifted signals, which pass through the beam splitter (310), lens (420) and back along fiber (300). A plurality of corresponding color filters, provided at the other end of the fiber (300) deflect the relevant color light onto individual photo-detectors thereby to produce a plurality of cyclically modulating phase-shifted electrical signals, from which the relative displacement of the readhead and scale may be determined. Where the fiber is of plastics material the light is preferably in the infra-red spectrum to produce attenuation.

19 Claims, 3 Drawing Sheets

OPTO-ELECTRONIC SCALE READING APPARATUS HAVING LIGHT-TRANSMISSIVE PHASE-ENCODING ARRAY OF ELONGATE SPECTRAL ENCODING ELEMENTS

BACKGROUND OF THE INVENTION

1. Field of the Invention

The present invention relates to an opto-electronic scale reading apparatus, used on a coordinate positioning machine such as a machine tool for example, to measure the relative displacement of two members.

2. Description of Related Art

It is known to construct an opto-electronic scale reading apparatus in accordance with the teaching of GB 1504691, incorporating a readhead having index and analyzer gratings. A light source within the readhead projects a beam of light through the index grating and onto the scale, which interacts with the incident light to generate a series of spatial fringes in the plane of the analyzer grating. Relative movement between the scale and the readhead causes corresponding relative movement between the fringes and the analyzer grating, producing a light intensity modulation when the moving fringes are viewed from the side of the analyzer grating remote from the scale as a result of the shuttering action of the analyzer on the fringes. A plurality of phase-shifted light intensity modulations may be generated by providing a corresponding plurality of analyzer gratings having lines shifted relative to each other by a fraction of the grating pitch corresponding to the required phase angle. For example, three analyzer gratings each offset relative to each other by one third of the pitch will result in three sets of light intensity modulations having phase shifts of 120° (as shown in EP 272297). An alternative method of generating a plurality of phase-shifted electrical signals is to provide a structured photodetector, known as an electrograting, in place of the (or each) analyzer grating. The electrograting comprises an array of elongate photosensitive elements, extending in a direction parallel to the lines of the scale, which are grouped into a plurality of sets (e.g. A,B,C); the number of sets of photosensitive elements corresponding to the number of phase-shifted signals required. The elements are provided in a repeating pattern (ABCABC . . . ) with elements of each set being electrically connected in common. The spacing between any two elements in the same set is equal to an integer multiple of the pitch of the interference fringes generated by the readhead, and thus all elements in the given set are exposed to approximately the same intensity of light. Relative movement between the scale and the readhead causes the fringes to move across the surface of the electrograting, resulting in a series of phase-shifted modulating electrical signals from the sets of elements in the electrograting. Such an electrograting is known from EP 543513 and has an advantage in that the light contributing to the generation of each of the plurality of phase-shifted signals originates from substantially the same region of the scale. This makes the apparatus relatively insensitive to contamination of the scale due to dirt or scratching, for example.

SUMMARY OF THE INVENTION

The present invention provides an alternative readhead. According to the present invention an opto-electronic scale reading apparatus includes a scale having a series of spaced-apart lines extending in a first direction, and spaced apart in a second direction, and a readhead, the scale and readhead being movable relative to each other in the second direction, the readhead including means for projecting incident light onto the scale, and generating, at an analyzer, a periodic light pattern, and upon relative movement of the scale and readhead, a light intensity modulation, wherein the readhead further comprises phase encoding means to enable the generation of a plurality of phase-shifted electrical signals from the light intensity modulation, the phase encoding means comprising an array having a plurality of elongate spectrally encoding elements, extending substantially in the direction, the elements being divided into a plurality of sets with elements of a given set having the same spectral encoding characteristic, and wherein the elements are provided in the array in a repeating pattern.

In one embodiment of the present invention the phase encoding light transmitting array is provided in place of the analyzer, and the spectral encoding capability is provided by color encoding of polychromatic light in the periodic light pattern. A plurality of light filters may then be provided downbeam of the analyzer, in order to divert different light colors onto different photodetectors, thereby to generate the electrical modulating phase-shifted signals.

BRIEF DESCRIPTION OF DRAWINGS

Embodiments of the invention will now be described, by way of example, and with reference to the accompanying drawings, in which.

DESCRIPTION OF PREFERRED EMBODIMENTS

Figure 1:
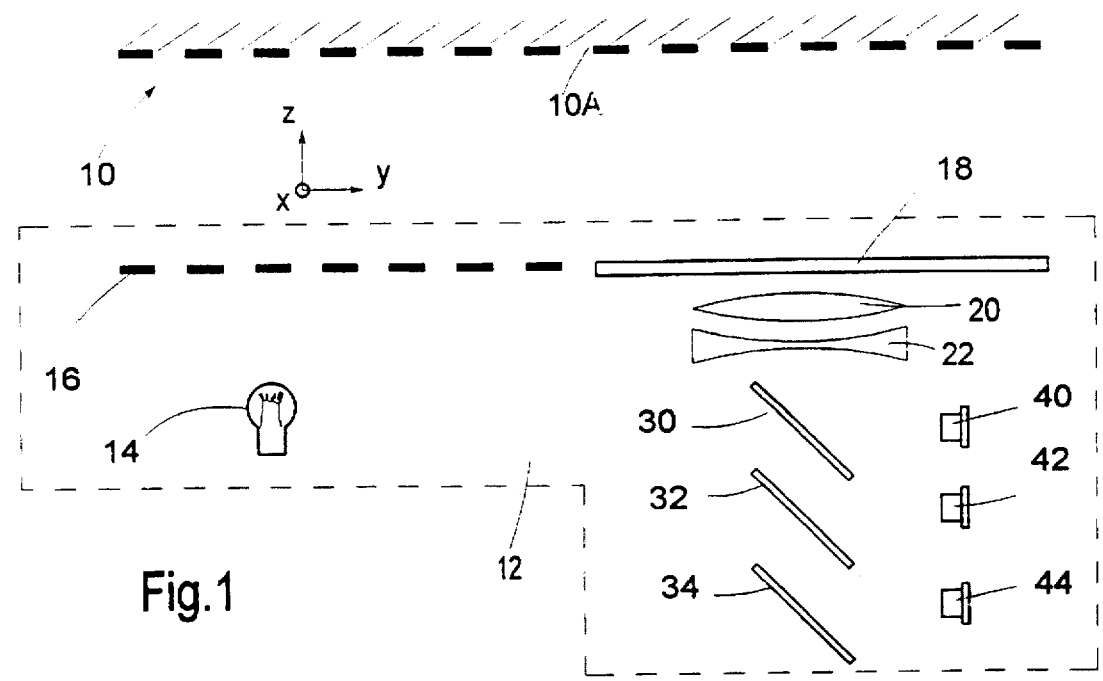
FIG. 1 is a schematic illustration of a first embodiment of the present invention.
Figure 2:
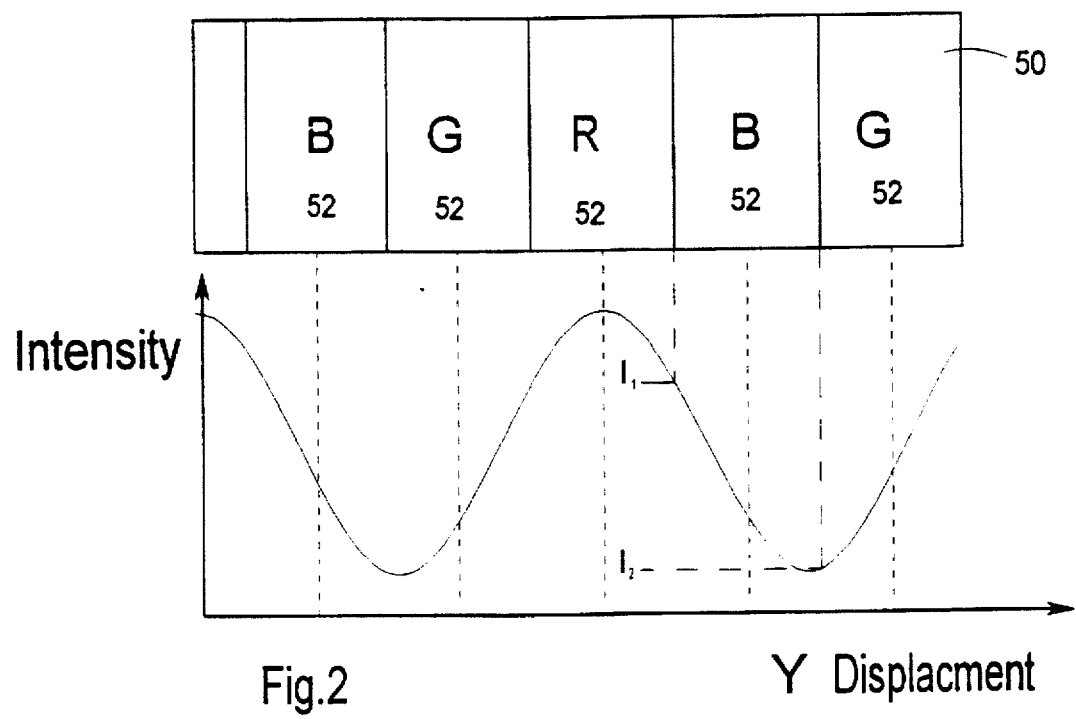
FIG. 2 is a detail of FIG. 1.

Referring now to FIGS. 1 and 2, an opto-electronic scale reading apparatus includes a reflective scale 10, defined by a series of substantially parallel, elongate non-reflective lines 10A. The scale 10 extends in an xy plane, with the lines 10A being spaced apart in the y direction and extending in the x direction. A readhead 12 offset from the scale in the z direction, is movable relative to the scale 10 in the y direction, and includes a polychromatic diffuse light source 14, which projects a beam of light onto the scale 10 via an index grating 16. The scale interacts with the beam of incident light to generate a periodic light pattern (e.g. in the form of interference fringes) in the plane of an analyzer 18, which lies adjacent the index grating 16. The interference fringes extend substantially parallel to the lines 10A of the scale, are spaced apart substantially in the y direction and their intensity modulates substantially sinusoidally with displacement in the y direction. The spacing in the z direction between index grating 16 and scale 10, and scale 10 and analyzer 18, together with the relative pitch of index grating 16 and scale 10 which are required in order to generate the light pattern in the plane of analyzer 18 are well known per se, and are described, for example, in GB 1504691 (NRDC). Light forming the periodic light pattern is incident upon, and passes through the analyzer 18, which performs a spectral encoding function to enable the generation of a plurality of phase-shifted electrical signals. In the present example, the spectral encoding is performed by chromatic encoding of the light into three separate colors, with the light intensity of each of the colors modulating in phase-shifted relationship upon relative movement of the scale and readhead.

Light passing through the analyzer 18 is compressed into a relatively dense beam by means of convex and concave lenses 20,22, whereupon light from each of the three color coded bands is decoded by three dichroic filters 30,32,34 and directed by means of these filters onto three corresponding photodetectors 40,42,44. The phase-shifted modulating outputs of the photodetectors 40,42,44 are combined in a manner known per se, in order to generate a pair of sinusoidally varying signals having a quadrature relationship which may be used to determine both the magnitude and direction of relative movement of the scale and readhead 10,12.

Referring now to FIG. 2, the analyzer 18 and its color-encoding interaction with the interference fringes incident thereon will now be described. The analyzer 18 comprises a light transmitting substrate 50 having a plurality of elongate light transmitting spectral encoding elements 52 provided thereon. The elements 52 extend substantially parallel to the lines 10A of the scale, and substantially perpendicular to the y direction of relative movement of the scale 10 and readhead 12. In the present example, the elements 52 are red, blue and green (RBG) color filters, provided across the substrate 50 in a repeating pattern, and with the spacing between the center of correspondingly colored elements being equal to an integer multiple of the pitch of the interference fringes. In the present example the spacing between adjacent elements of the same color is a single pitch P, as can be seen in FIG. 2. A consequence of this geometry of the analyzer 18 is that the light intensity of interference fringes incident upon each color filter of a given color will be substantially the same for any given relative displacement of the scale 10 and readhead 12. Thus, as the interference fringes move relative to the analyzer 18 each of the sets of color filters 52 RBG will transmit a substantially sinusoidal light intensity modulation, with the red, blue and green light intensity modulations having a phase separation of substantially 120°. NB. Additional sets of phase-shifted signals may be obtained by adding further sets of color filters, such as yellow, for example. Different phase angles between adjacent color filters may be obtained by shifting the spacing of the center of each of the filters relative to each other with respect to the pitch of the interference fringes (e.g. a center-to-center spacing corresponding to one quarter of the pitch corresponds to a phase angle of 90°).

Figure 3:
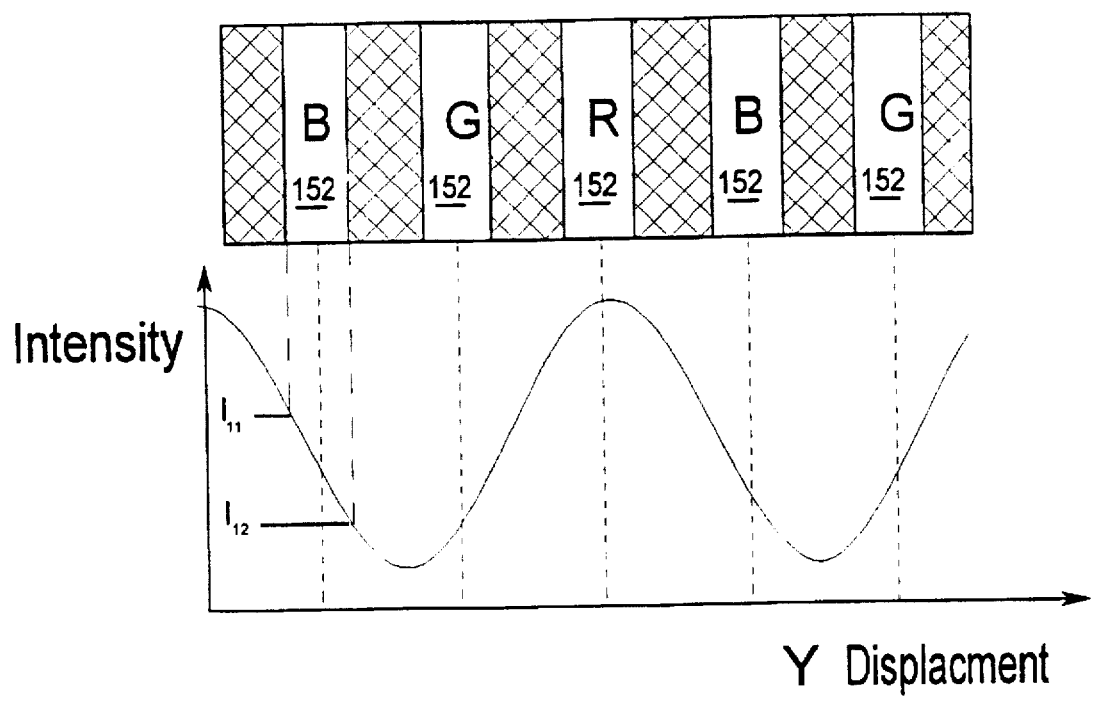
FIG. 3 is a modification of the detail of FIG. 2.

The resolution of the encoding array increases with decreasing width of the elements in relation to the fringe pitch because the variation in the intensity of light incident upon an individual element of the array across the width of the element decreases with decreasing width of the element. Referring to FIG. 3, a further example of encoding array can be seen in which only approximately half of the array surface is light transmitting; the areas between the individual elements 152 are made non-light transmitting, and the width of the elements is reduced relative to the fringe pitch. As a result, the intensity of light passing through the blue element 152B varies only between $I_{11}$ and $I_{12}$, as compared with a variation of $I_1$ to $I_2$ in the array of FIG. 2. The result of reducing the width in this way is therefore sharper output signals of lower amplitude.

Figure 4:
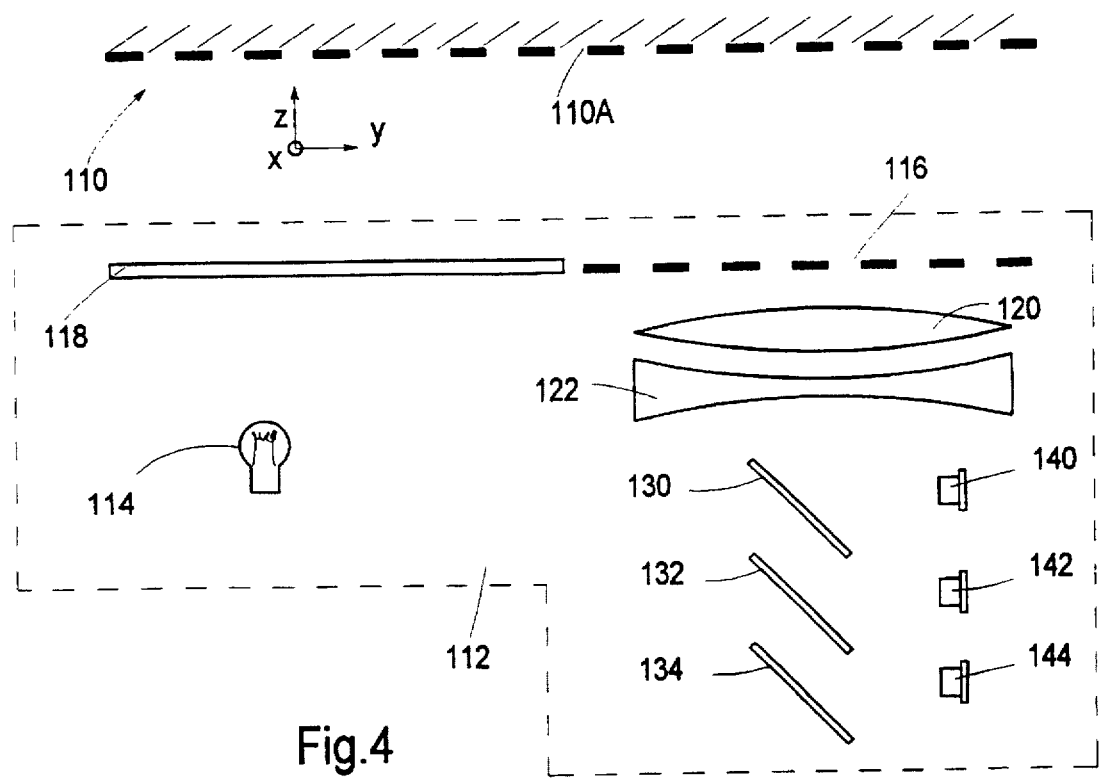
FIG. 4 is a schematic illustration of a second embodiment of the present invention.

Referring now to FIG. 4, in an alternative, but equivalent embodiment of the present invention, a readhead 112 includes a light source 114 which projects a beam of light through an index grating, provided by a light transmissive spectral encoding array 118, and onto a scale 110. The light reflected from the scale 110 interacts therewith to form a series of color coded interference fringes at an analyzer, provided by grating 116. The resultant light intensity modulation, which occurs upon relative movement of the scale 110 and readhead 112 is compressed by lenses 120, 122, and decoded by dichroic filters 130,132,134 onto photodetectors 140,142,144. In this embodiment, light transmissive array 118 may be said to act in a manner similar to a conventional grating, in that the blue and green elements of the array are opaque to red light emitted from source 114, the red and blue elements 152 of the array are opaque to green light emitted from the source 114, and so on.

Figure 5:
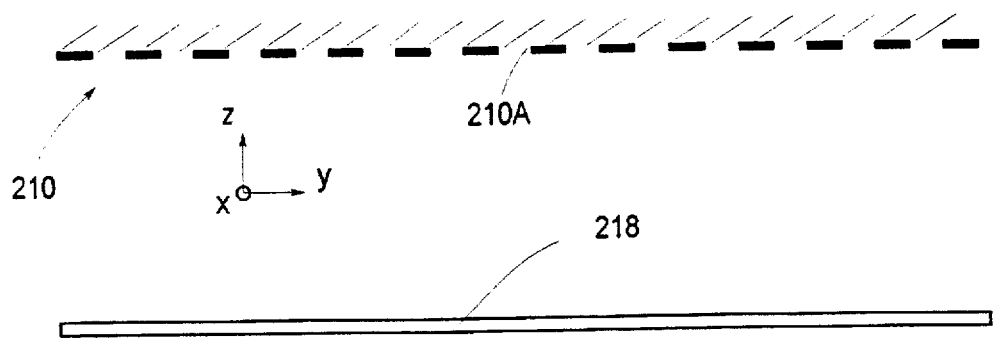
FIG. 5 is a schematic illustration of a third embodiment of the present invention.

In a further embodiment shown in FIG. 5, both the index and analyzer of the readhead are provided by a light transmissive color encoding array 218. Other parts of the apparatus having corresponding reference numerals function in the same way as described previously.

Figure 6:
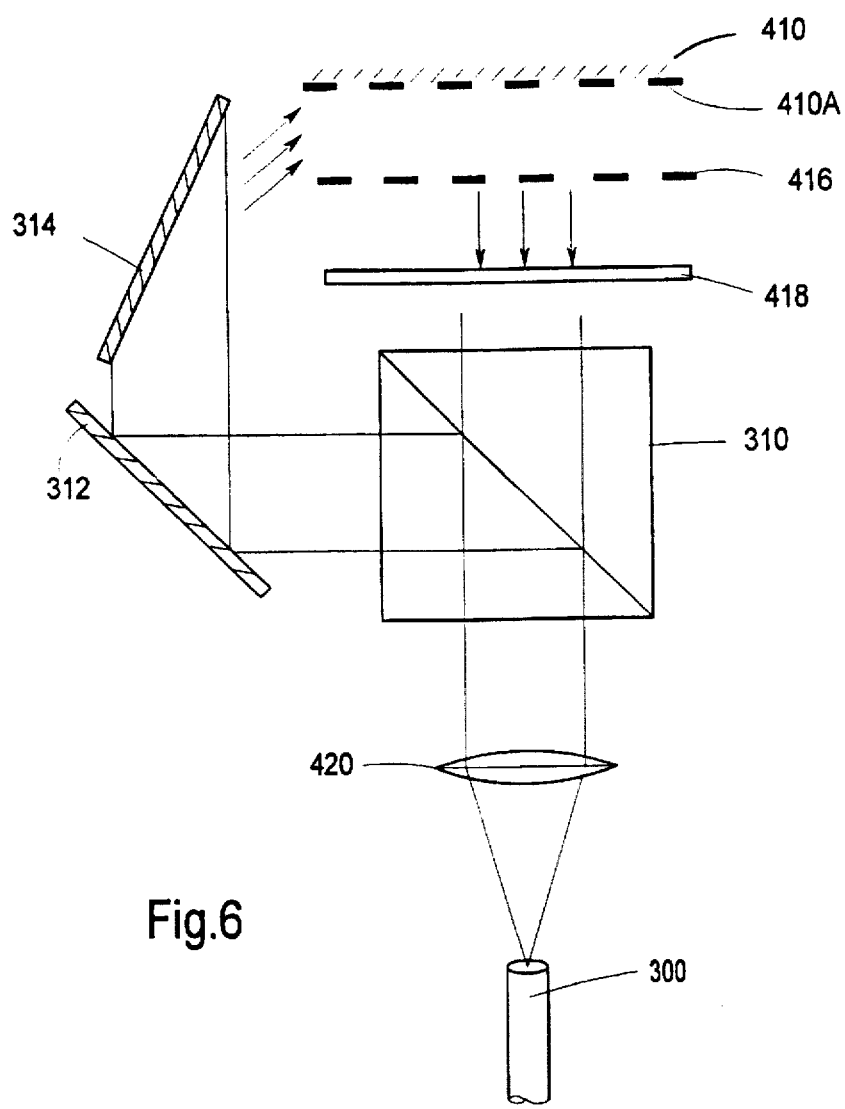
FIG. 6 is a schematic illustration of a fourth embodiment of the present invention.

In a further improvement of the illustrated apparatus, the light sources, imaging lenses, dichroic filters, and photodetectors may be provided remote from the readhead, with the incoming and outgoing light being transmitted to and from the readhead along one or more optical fibers. Referring now to FIG. 6, an opto-electronic scale reading apparatus has a scale 410 with lines 410A, illuminated by a light source in the form of the emission end of an optical fiber 300, a beam splitter 310 and deflecting optics 312,314 project light onto the scale 410. The light, which is polychromatic light in the infra-red spectrum to reduce attenuation in the fiber (which may be of glass or plastics material), is reflected off the scale 410 and passes through an index grating 416. The interaction of light reflected from the scale 410 with the index grating generates interference fringes in the plane of analyzer 418, in the form of a spectrally encoding array of the type described earlier. This optical mechanism is described in more detail in EP 207121. Light passing through the analyzer is compressed by a lens 420 and the part of the light passing through the beam splitter 310 is transmitted into the end of fiber 300 and along the fiber to the decoding optics and photodetectors.

In a modification, separate fibers are provided for incoming and outgoing light, enabling the removal of the beam splitter and deflecting optics from the readhead.

Thus, in one embodiment of the invention the index is provided by a grating and the analyzer by a spectrally encoding light transmitting array; in a further embodiment the index is provided by a spectrally encoding light transmitting array and the analyzer is provided by a grating; in yet a further embodiment both the index and analyzer are provided by a spectrally encoding light transmitting array; and in yet a further embodiment, not described in detail, the scale (being either transmissive or reflective) is provided by a spectrally encoding array.

If the light source is provided in the form of a plurality of coherent light beams of differing wavelengths, and the scale is of diffraction quality, then no index grating is required, and a periodic light pattern will be generated simply by the interaction of the light with the scale (a plurality of beams are required because coherent light has substantially only a single wavelength and therefore a single coherent beam cannot easily be spectrally encoded into a plurality of phases).

Further configurations of readhead known per se which generate a periodic light pattern upon an analyzer may also incorporate a spectral encoding light transmitting array in accordance with the present invention such as, for example, "contact-type" readheads, which operate primarily upon a simple shuttering principle.

In this application the term "light" does not necessarily relate to electromagnetic radiation in the visible spectrum, and includes within its scope light in the ultra violet and infra red spectra. Further, the different features of the invention as described above are not necessarily limited to their association with the embodiments in connection with which they were described. Many aspects of the invention are generally applicable to other embodiments of the invention described herein.

I claim:

1. Opto-electronic scale reading apparatus comprising:
a scale and a readhead which are relatively movable,
the readhead including means for projecting light onto the scale and generating a periodic light pattern in an analyzer plane so that relative movement of the scale and readhead results in a cyclically varying light intensity modulation at a point in the analyzer plane, the apparatus including:
a phase-encoding array of elongate spectral encoding elements through which the projected light passes, the elements being grouped into at least three sets, each set of elements having a different spectral encoding characteristic, elements in a given set having substantially the same spectral encoding characteristic, and the elements occurring in a repeating pattern on the array.

2. Apparatus according to claim 1, wherein the scale is light transmissive.

3. Apparatus according to claim 1, wherein the scale is light reflective.

4. Apparatus according to claim 1, wherein the projecting means comprises a light source and an index grating, light passing from the light source onto the scale, and subsequently interacting with the index grating to generate the periodic light pattern at an analyzer positioned in the analyzer plane.

5. Apparatus according to claim 1, wherein the projecting means comprises an index grating and a light source, light passing from the light source onto the index grating, and subsequently interacting with the scale to generate the periodic light pattern at an analyzer positioned in the analyzer plane.

6. Apparatus according to claim 1, wherein the projecting means comprises a plurality of coherent light sources and the scale, the light sources and the scale co-operating to generate the periodic light pattern at an analyzer positioned in the analyzer plane.

7. Apparatus according to claim 4, wherein the array is one of the scale, the index grating, and the analyzer.

8. Apparatus according to claim 6, wherein the array is one of the scale and the analyzer.

9. Apparatus according to claim 7, further comprising a plurality of spectral filters provided downbeam of the analyzer, and a plurality of photodetectors to decode the spectrally encoded light into a plurality of phase-shifted electrical signals.

10. Apparatus according to claim 9, comprising an optical fiber for transmitting light from the analyzer to the plurality of spectral filters.

11. Apparatus according to claim 10, wherein the projecting means includes a light source which is provided by a light emitting end of an optical fiber.

12. Apparatus according to claim 9, wherein the light source emits polychromatic light in the visible spectrum.

13. Apparatus according to claim 9, wherein the light source emits polychromatic light in the infra-red spectrum.

14. Apparatus according to claim 5, wherein the array is one of the scale, the index grating, and the analyzer.

15. Apparatus according to claim 14, further comprising a plurality of spectral filters provided downbeam of the analyzer, and a plurality of photodetectors to decode the spectrally encoded light into a plurality of phase-shifted electrical signals.

16. Apparatus according to claim 15, comprising an optical fiber for transmitting light from the analyzer to the plurality of spectral filters.

17. Apparatus according to claim 16, wherein the projecting means includes a light source which is provided by a light emitting end of an optical fiber.

18. Apparatus according to claim 15, wherein the light source emits polychromatic light in the visible spectrum.

19. Apparatus according to claim 15, wherein the light source emits polychromatic light in the infra-red spectrum.

* * * * *